(12) United States Patent
Matsumoto et al.

(10) Patent No.: US 6,798,584 B2
(45) Date of Patent: Sep. 28, 2004

(54) LENS APPARATUS FOR PROJECTION

(75) Inventors: Susumu Matsumoto, Sano (JP); Kumajiro Sekine, Sano (JP); Yasuhiro Sekine, Sano (JP); Yasaburou Ootaka, Sano (JP)

(73) Assignee: Sekinos Co., Ltd. (JP)

( * ) Notice: Subject to any disclaimer, the term of this patent is extended or adjusted under 35 U.S.C. 154(b) by 0 days.

(21) Appl. No.: 10/327,904

(22) Filed: Dec. 26, 2002

(65) Prior Publication Data

US 2003/0090812 A1 May 15, 2003

Related U.S. Application Data

(63) Continuation of application No. 09/690,808, filed on Oct. 18, 2000, now Pat. No. 6,552,859.

(30) Foreign Application Priority Data

Dec. 28, 1999 (JP) .................................................. 372537

(51) Int. Cl.$^7$ ............................................... G02B 9/00
(52) U.S. Cl. ...................................... 359/738; 359/649
(58) Field of Search ............................... 359/738–740, 359/649–651, 811, 819

(56) References Cited

U.S. PATENT DOCUMENTS

| | | | |
|---|---|---|---|
| 4,810,076 A | 3/1989 | Murao et al. ................ | 350/448 |
| 5,129,726 A | 7/1992 | Nielsen ....................... | 356/402 |
| 5,537,166 A | 7/1996 | Keelan et al. ................ | 353/97 |
| 5,570,140 A | 10/1996 | Toide et al. ................. | 348/744 |
| 5,644,435 A * | 7/1997 | Shikama ...................... | 359/691 |
| 5,842,055 A * | 11/1998 | Tamura ........................ | 396/72 |
| 6,154,320 A | 11/2000 | Itoh et al. ................... | 359/629 |
| 6,157,501 A | 12/2000 | Sato et al. ................... | 359/819 |
| 6,226,129 B1 * | 5/2001 | Fukunaga ..................... | 359/663 |
| 6,252,722 B1 | 6/2001 | Kittaka et al. ............... | 359/654 |
| 6,646,819 B2 * | 11/2003 | Greenberg ................... | 359/738 |
| 6,657,796 B2 * | 12/2003 | Greenberg ................... | 359/738 |
| 2001/0013977 A1 * | 8/2001 | Tadio-Galeb et al. ....... | 359/649 |

FOREIGN PATENT DOCUMENTS

| | | | |
|---|---|---|---|
| JP | 1-250916 | 10/1989 | .......... G02B/13/18 |
| JP | 3-157088 | 7/1991 | ............ H04N/9/31 |
| JP | 7-60202 | 6/1995 | ............ G02B/5/22 |
| JP | 8-292492 | 11/1996 | ........... G03B/21/00 |

* cited by examiner

*Primary Examiner*—Jordan M. Schwartz
(74) *Attorney, Agent, or Firm*—Lorusso, Loud & Kelly

(57) ABSTRACT

A lens apparatus for projection includes a plurality of lenses on an optical axis. A shading plate 11 for covering the peripheral portion of the lens to block off light entering the peripheral portion is provided as a single member on the optical axis with the lenses to omit an inking process. In addition, the shading plate 11 is integrally provided with a contrast compensating plate 13 for compensating a projected image, so that it is not required to provide any portions for supporting the contrast compensating plate 13. Moreover, a shading wall 23 for blocking off light leaking out of the peripheral portion of the lens is provided on the peripheral portion of the shading plate 11. Thus, it is possible to provide a lens apparatus for projection, which has a simple structure and which can be easily assembled to reduce the producing costs.

4 Claims, 6 Drawing Sheets

LENS APPARATUS FOR PROJECTION

CROSS-REFERENCE TO RELATED APPLICATION

This application is a continuation application of Ser. No. 09/690,808 filed Oct. 18, 2000, now U.S. Pat. No. 6,552,859.

BACKGROUND OF THE INVENTION

1. Field of the Invention

The present invention relates generally to a lens apparatus for projection wherein the adjustment of contrast and shading means are improved.

2. Description of the Prior Art

In recent years, television projectors are widely utilized as displays for displaying images received from television broadcasting, as well as images outputted from electronic image apparatuses, such as VTRs. Although lens apparatuses for projection for use in such projectors have a very great power, it is naturally required that the lens apparatuses have various small aberrations to realize good optical characteristics.

An example of such a lens apparatus for projection is shown in FIG. 2. This lens apparatus for projection 1 comprises a negative first lens group 2, a positive second lens group 3, a positive third lens group 4 having the strongest power of component lenses, a positive fourth lens group 5, a positive fifth lens group 6, a negative sixth lens group 7, and a negative field curvature correction unit 8 for correcting almost all of the curvature of field of the lens system, which are arranged in that order from the side of a screen. In this example, each of the first through sixth lens groups is a single lens. This lens apparatus for projection 1 is integrated with a cathode-ray tube (not shown) to be used.

The field curvature correction unit 8 comprises a left first lens portion 8A, a right second lens portion 8B, a cooling liquid 8c, which is filled therebetween for fulfilling lens functions, and an inked portion 8D which is provided on the left side face of the first lens portion 8A. The inked portion 8D is applied on the periphery of the left side face of the first lens portion 8A for removing undesired light, such as scattered light, which is incident on the periphery of the lens, to prevent light from diffusing.

In accordance with colors of RGB, three lens apparatuses for projection are provided in parallel. These three lens apparatuses for projection for colors of RGB are usually arranged laterally.

By the way, in a system for projecting light from three light sources for RGB, which are laterally arranged, to project an image, there is the following disadvantage. That is, since the central light source is provided at a position, at which its optical axis is perpendicular to the surface of the screen, to perpendicularly irradiate the surface of the screen with light, the difference in contrast does not appear on the irradiated surface, but the difference in contrast appears by the light sources which are provided on the right and left sides. That is, light emitted from the light source provided on the left side with respect to the screen is bright on the surface of the screen on the left side which is near the light source, and dark on the surface of the screen on the right side which is distant from the light source, whereas light emitted from the light source provided on the right side with respect to the screen is bright on the surface of the screen on the right side which is near the light source, and dark on the surface of the screen on the left side which is distant from the light source.

In order to solve this disadvantage, a contrast adjusting plate (not shown) is provided on the left side of the first lens portion 8A of the field curvature correction unit 8. This contrast adjusting plate comprises a single member, such as an elongated plate, and is arranged on the left side of the first lens portion 8A. Since the contrast adjusting plate must be accurately positioned, a portion for supporting the contrast adjusting plate is provided.

However, the operation for applying the above described inked portion 8D on the periphery of the left side face of the first lens portion 8A can not be easily carried out, and one step of applying operation is added to the assembly operation.

In addition, the lens apparatus for projection must be provided with the portion for supporting the contrast adjusting plate, so that the structure of the lens apparatus for projection is complicated.

As a result, there is a problem in that the cost of producing the lens apparatus for projection is increased.

SUMMARY OF THE INVENTION

It is therefore an object of the present invention to eliminate the aforementioned problems and to provide a lens apparatus for projection, which has a simple structure and which can be easily assembled to reduce the producing costs.

In order to accomplish the aforementioned and other objects, according to one aspect of the present invention, a lens apparatus for projection comprises: a lens or two or more lenses provided on an optical axis; and a shading plate, provided as a single member on the optical axis with the lens or one of the lenses, for covering a peripheral portion of the lens or the one of the lenses to block off light entering the peripheral portion.

With this construction, since the shading plate is provided as a single member, it is possible to omit an inking process, which takes time.

The lens apparatus for projection may further comprise a contrast compensating plate for compensating contrast of a projected image, the contrast compensating plate being integrated with the shading plate.

With this construction, since the contrast compensating plate is integrated with the shading plate, it is not required to provide any portions for supporting the contrast compensating plate, so that it is possible to reduce the number of parts. Thus, it is possible to reduce the costs of producing the lens apparatus for projection since it is also possible to omit the inking process which takes time.

The lens apparatus for projection may further comprise a shading wall for blocking off light leaking out of the peripheral portion of the lens or the one of the lenses, the shading wall being formed on a peripheral portion of the shading plate by extending or bending the peripheral portion of the shading plate.

With this construction, the shading wall can surely block off light, such as scattered light, which leaks out of the periphery of the lens.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of a lens apparatus for projection according to the present invention will be described below. Since the whole construction of a lens apparatus for projection in this preferred embodiment is substantially the same as that of the above described lens apparatus for projection, the same reference numbers are given to the same members, and the description thereof is omitted.

In this preferred embodiment, a first lens portion 10 corresponding to the first lens portion 8A of the conventional field curvature correction unit 8 has a flange portion 10A. That is, the flange portion 10A is provided so as to continuously extend around a concave side portion 10B which contributes to the refraction of light.

Figure 1:
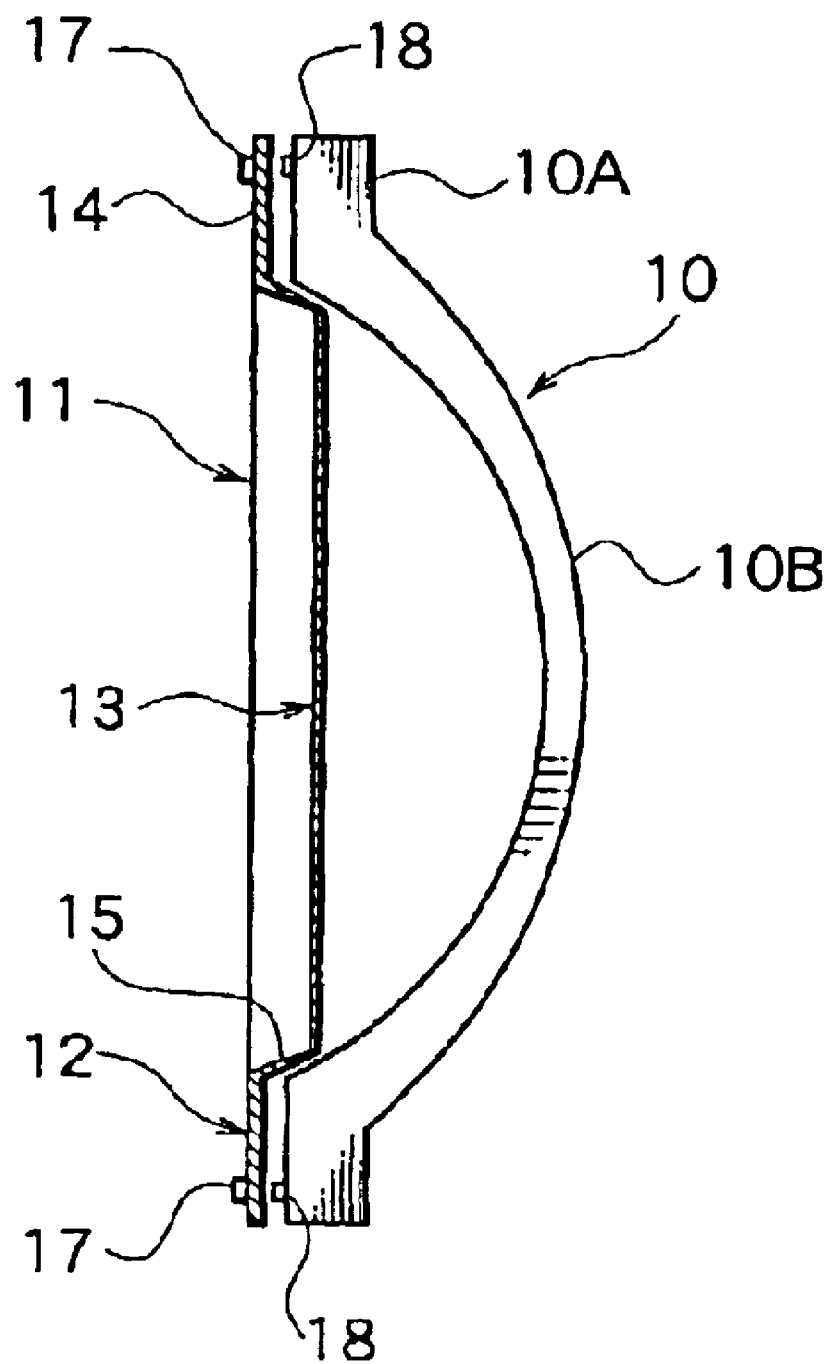
FIG. 1 is a sectional view of a shading plate of the first preferred embodiment of a lens apparatus for projection according to the present invention.
Figure 2:
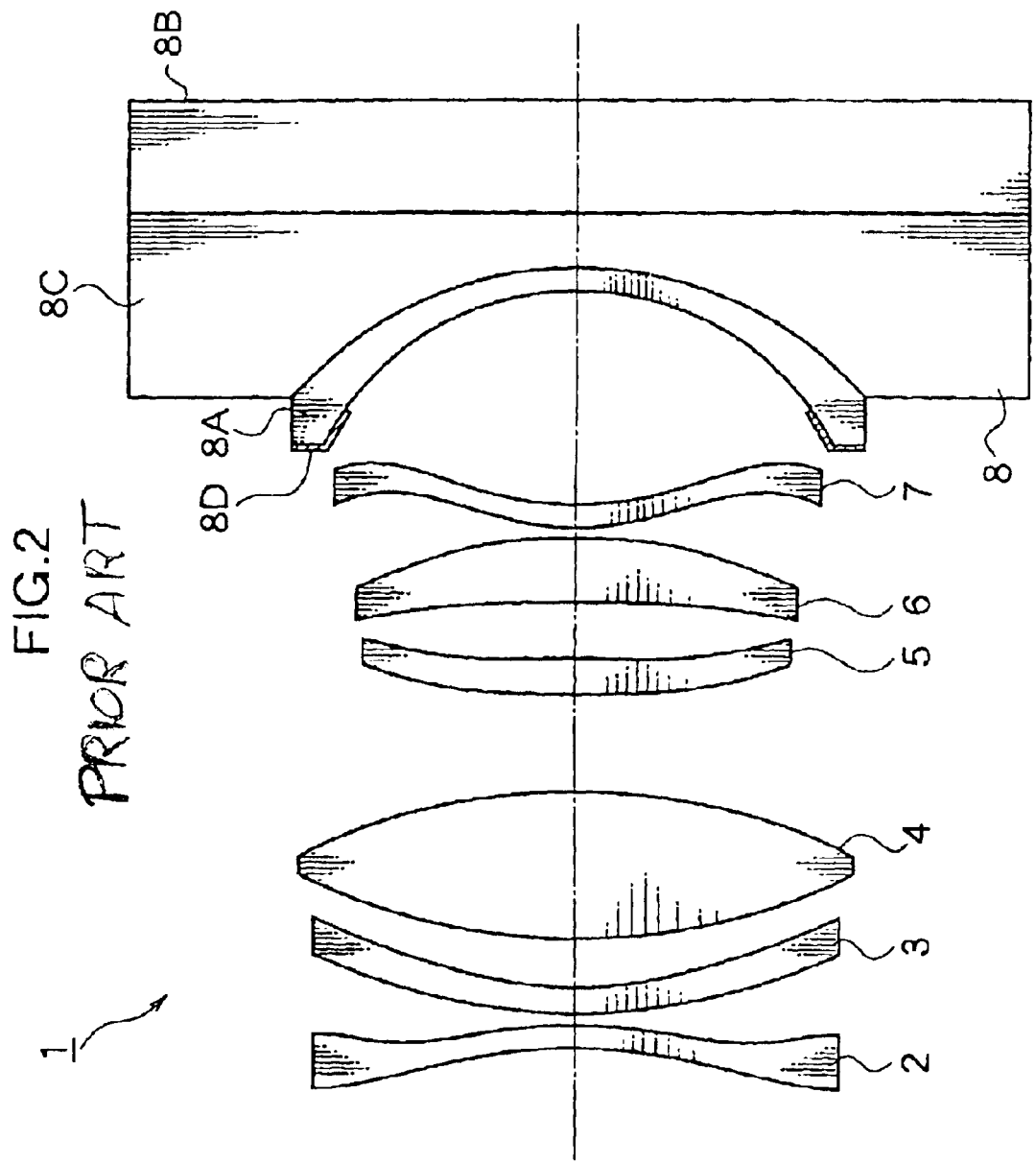
FIG. 2 is a schematic sectional view showing the construction of a lens apparatus for projection.
Figure 3:
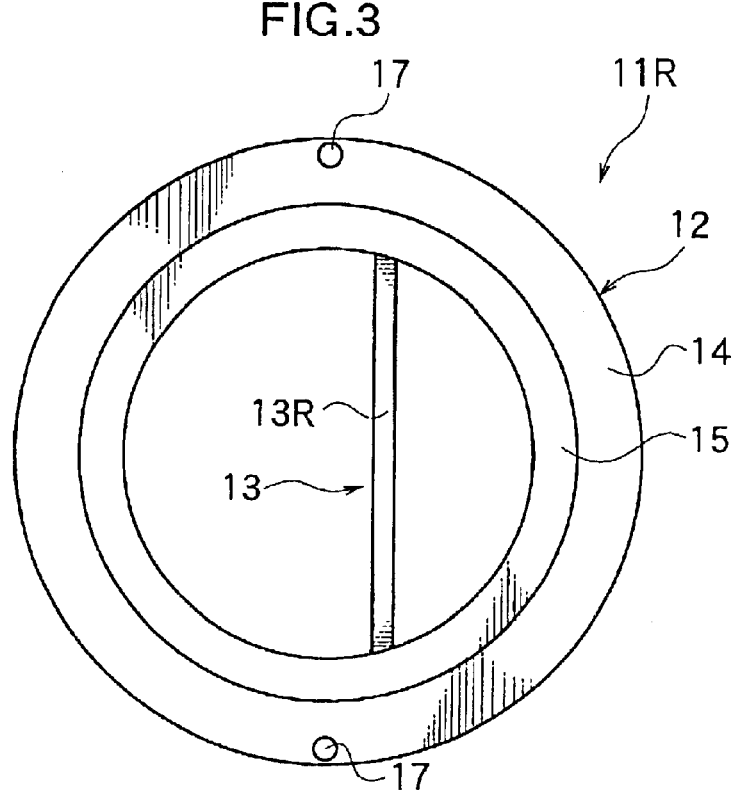
FIG. 3 is a plan view of a shading plate for red.
Figure 4:
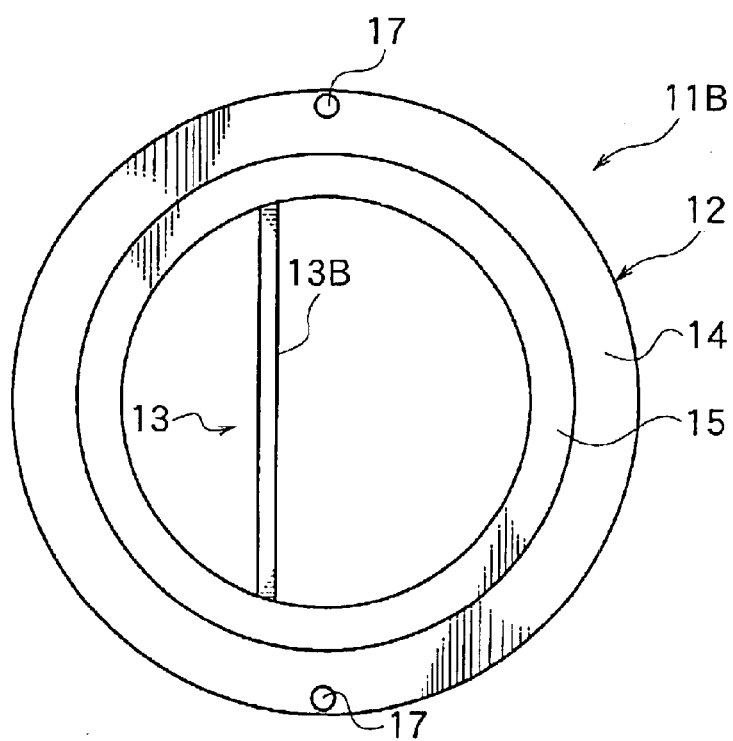
FIG. 4 is a plan view of an oblique plate portion for blue.
Figure 5:
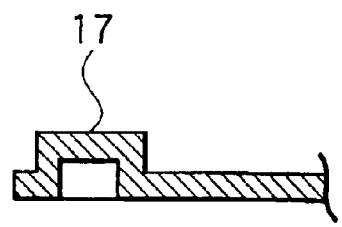
FIG. 5 is a sectional view of an engaged recessed portion of a shading plate.

The lens apparatus for projection in this preferred embodiment is characterized in that a shading plate 11 is provided in place of the conventional inked portion 8D and contrast adjusting plate. This shading plate 11 is shown in FIGS. 1, 3, 4 and 5. Furthermore, FIG. 3 is a plan view of a shading plate 11R for red, and FIG. 4 is a plan view of a shading plate 11B for blue.

The shading plate 11 (including both of the shading plate 11R for red and the shading plate 11B for blue) mainly comprises a ring portion 12 and a plate portion 13.

The ring portion 12 comprises an annular flat plate portion 14 and a conical oblique plate portion 15. The annular flat plate portion 14 is a member for contacting the flange portion 10A of the first lens portion 10 to support the shading plate 11 on the side of the first lens portion 10. The inside diameter of the annular flat plate portion 14 is set to be substantially equal to the inside diameter of the peripheral portion of the concave side portion 10B. Thus, the outside diameter of a boundary portion between the conical oblique plate portion 15 and the annular flat plate portion 14 is substantially equal to the inside diameter of the peripheral portion of the concave side portion 10B. As a result, when the ring portion 12 is fitted into the first lens portion 10, the ring portion 12 is precisely positioned without being rattled (in a direction perpendicular to the optical axis).

The annular flat plate portion 14 is provided with engaged recessed portions 17 at opposite two positions. The flange portion 10A of the first lens portion 10 is provided with engaging protruding portions 18 at positions facing the engaged recessed portions 17. By fitting the engaging protruding portions 18 into the engaged recessed portions 17, the shading plate 11 is positioned in rotational directions with respect to the first lens portion 10.

The conical oblique plate portion 15 is a member for covering the inside of the periphery of the concave side portion 10B of the first lens portion 10 to block off undesired light, such as scattered light. This conical oblique plate portion 15 is formed so as to conically project along the inside of the concave side portion 10B of the first lens portion 10 from the inner edge of the annular flat plate portion 14. The conical oblique plate portion 15 covers the periphery of the first lens portion 10 to block off undesired light, such as. scattered light.

The plate portion 13 is a contrast compensating plate, and is integrally formed with the ring portion 12. This plate portion 13 is provided on the tip side of the conical oblique plate portion 15 (on the right side in FIG. 1).

As shown in FIG. 3, the shading plate 11R for red is provided with a single plate portion 13R on the slightly right side from the center of the ring portion 12. This plate portion 13R comprises an elongated plate member having a constant width.

As shown in FIG. 4, the shading plate 11B for blue is provided with a single plate portion 13B on the slightly left side from the center of the ring portion 12. This plate portion 13B comprises an elongated plate member having a constant width similar to the above described plate portion 13R.

The shading plate 11 with the above described construction is combined with the first lens group 2 through the sixth lens group 7 and the field curvature correction unit 8 when the lens groups 2 through 7 and the unit 8 are assembled. Specifically, the conical oblique plate portion 15 of the shading plate 11 is inserted into the concave side portion 10B of the first lens portion 10, and the engaged recessed portions 17 of the shading plate 11 are fitted into the engaging protruding portions 18 of the first lens portion 10. Thus, the shading plate 11 can be easily and surely positioned in vertical and lateral directions (directions perpendicular to the optical axis) and rotational directions with respect to the first lens portion 10. Moreover, the plate portion 13 serving as a contrast compensating plate is also simultaneously positioned.

If the shading portion 11 is thus mounted on the first lens portion 10, it is possible to easily assemble the lens apparatus for projection, and it is not required to provide any portions for supporting the shading plate 11 and the plate portion 13, so that it is possible to simplify the structure of the lens apparatus for projection.

As a result, it is possible to reduce the cost of producing the lens apparatus for projection.

Figure 6:
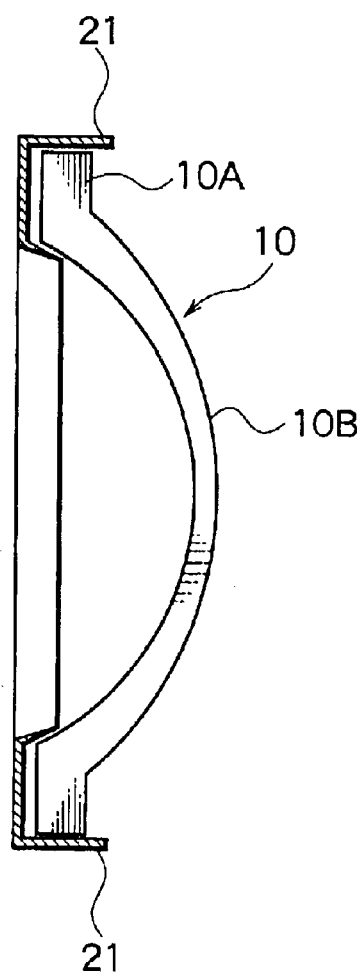
FIG. 6 is a sectional view of a first modified example of a shading plate.

MODIFIED EXAMPLES (1) While the outer peripheral portion of the shading plate 11 has been the flat plate portion in the above described preferred embodiment, a shading wall 21 may be provided as shown in FIG. 6. This shading wall 21 is formed by bending the outer peripheral portion of the shading plate 11 toward the light source. By this shading wall 21, it is possible to surely block off undesired light, such as scattered light, which enters the peripheral portion of the first lens portion 10.

The shading wall 21 may be formed so as to extend radially outside without bending the outer peripheral portion of the shading plate 11 toward the light source. Alternatively, the shading wall 21 may be formed by bending the outer peripheral portion of the shading plate 11 in the opposite direction to the light source. Also in these cases, it is possible to surely block off undesired light, such as scattered light, which enters the peripheral portion of the first lens portion 10.

Figure 7:
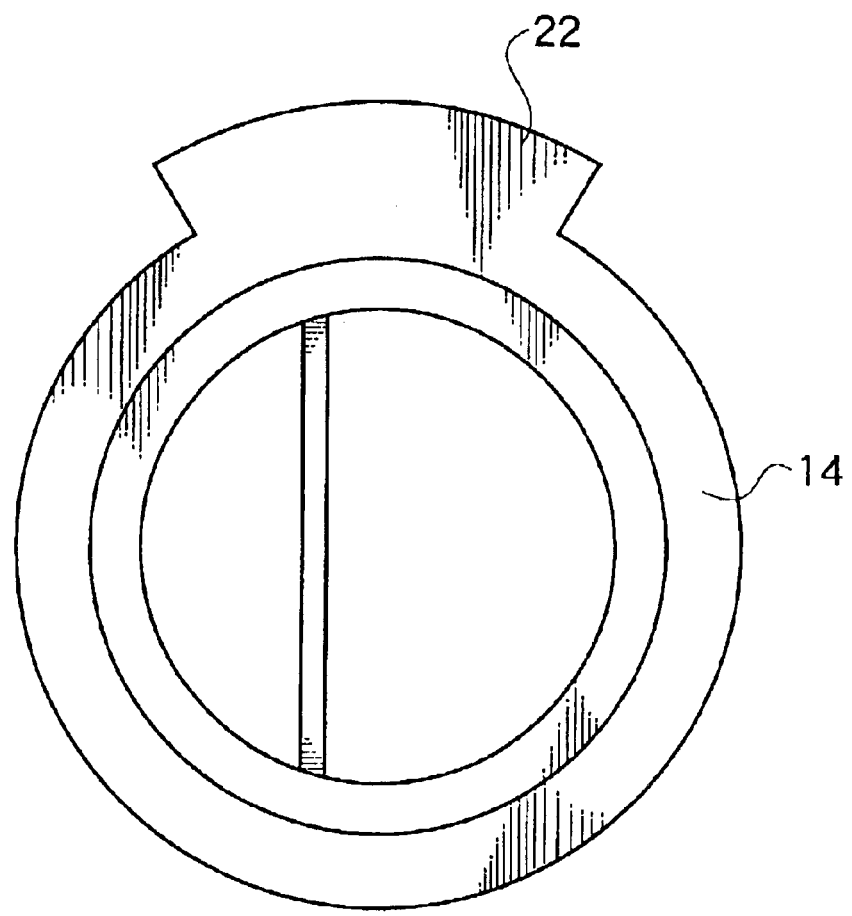
FIG. 7 is a plan view of a second modified example of a shading plate.
Figure 8:
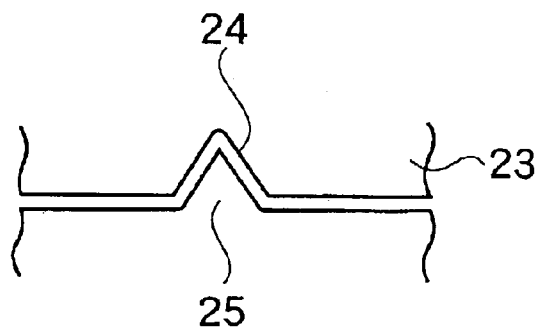
FIG. 8 is an enlarged view of a principal part of the second modified example.

(2) While the engaged recessed portion 17 has been provided as means for preventing the rotation of the shading plate 11 in the above described preferred embodiment, such means for preventing the rotation of the shading plate 11 may be formed as shown in FIGS. 7 and 8. That is, a part of the annular flat plate portion 14 may be extended radially outside to form a fan-shaped portion 22, and a shading wall 23 may be formed by bending the edge portion of the fan-shaped portion 22 toward the light source. Moreover, a V-shaped notch 24 may be formed in the edge portion of the shading wall 23 to engage a V-shaped protrusion 25 of the apparatus body. Thus, the shading plate 11 can be easily and surely positioned in vertical and lateral directions (directions perpendicular to the optical axis) and rotational directions with respect to the first lens portion 10. The notch 24 and the protrusion 25 may have any shape, such as semicircle, trapezoid, quadrangle or comb teeth, as long as the notch 24 engages the protrusion 25 to position the shading plate 11 in rotational directions.

Figure 9:
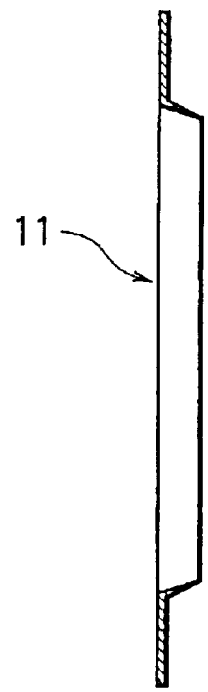
FIG. 9 is a sectional view of a third example of a shading plate.

(3) While the shading plate 11 has been integrally formed with the plate portion 13 in the above described preferred embodiment, the plate portion 13 may be omitted as shown in FIG. 9 to omit the inking process which takes time.

Figure 10:
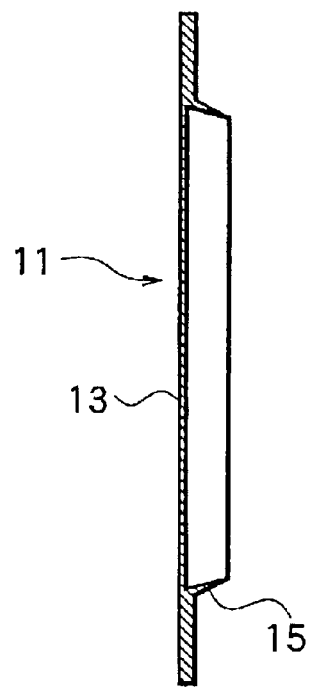
FIG. 10 is a sectional view of a fourth example of a shading plate.

(4) While the plate portion 13 has been provided on the tip side of the conical oblique plate portion. 15 of the shading plate 11 in the above described preferred embodiment, the plate portion 13 may be provided on the base end side as shown in FIG. 10. Also in this case, it is possible to obtain the same operation and effects as those in the above described preferred embodiment.

(5) While the plate portion 13R of the shading plate 11R for red has been formed as shown in FIG. 3 and the plate portion 13B of the shading plate 11B for blue has been formed as shown in FIG. 4 in the above described preferred embodiment, the plate portions 13R and 13B may be designed so as to have any one of various shapes if necessary. That is, since the degree of contrast varies in accordance with various conditions, such as the size of lenses and the difference in refractive index, the position, number and shape of the plate portions 13R and 13B are suitably designed in accordance with the respective conditions.

As describe above, according to the present invention, the shading plate for covering the peripheral portion of the lens to block off light entering the peripheral portion is provided as an independent single member readily positioned during assembly by mating portions of the lens and shading plate, so that it is possible to omit the inking process which takes time.

In addition, since the shading plate is integrally formed with the contrast compensating plate for compensating contrast of the projected image, it is not required to provide any portions for supporting the contrast compensating plate, so that it is possible to reduce the number of parts. Thus, it is possible to reduce the costs of producing the lens apparatus for projection since it is also possible to omit the inking process which takes time.

Moreover, since the shading wall for blocking off light leading out of the periphery of the lens is provided on the periphery of the shading plate by extending or bending the periphery of the shading plate, the shading wall can surely block off light, such as scattered light, which leaks out of the periphery of the lens.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A lens apparatus for projection of an image, the lens apparatus comprising:

at least one lens having an optical axis; and an annular shading plate, provided as a single member on said optical axis, for covering a peripheral portion of said at least one lens to block off scattered light which is incident on said peripheral portion;

wherein said at least one lens has a curved surface, and said shading plate has a conical portion for fitting a peripheral curved portion of the curved surface to block undesired light.

2. A lens apparatus for projection of an image, the lens apparatus comprising:

at least one lens having an optical axis; and an annular shading plate, provided as a single member on said optical axis, for covering a peripheral portion of said at least one lens to block off scattered light which is incident on said peripheral portion;

wherein said at least one lens has a concave portion surrounded by a flange portion; and said shading plate has an annular flat plate portion for contacting the lens flange portion and has a conical oblique portion for fitting into a peripheral portion of the lens concave portion.

3. A lens apparatus for projection of an image, the lens apparatus comprising:

at least one lens having an optical axis; and an annular shading plate provided as a single member on said optical axis for covering a peripheral portion of said at least one lens to block off scattered light which is incident on said peripheral portion;

wherein said at least one lens and said annular shading plate have mating portions positioning said annular shading plate relative to said at least one lens in directions perpendicular to the optical axis.

4. A lens apparatus according to claim 3 wherein mating portions also position said shading plate relative to said at least one lens in a rotational direction about said optical axis.

* * * * *